United States Patent [19]

Karlan

[11] 4,368,851
[45] Jan. 18, 1983

[54] NEEDLE STREAM VALVE

[76] Inventor: Paul Karlan, 511 Center Ave., Mamaroneck, N.Y. 10543

[21] Appl. No.: 147,846

[22] Filed: May 8, 1980

[51] Int. Cl.³ .............................................. B05B 1/30
[52] U.S. Cl. ...................................... 239/581; 251/8
[58] Field of Search ............... 239/581, 586, 569, 578, 239/272, 282, 283; 251/8

[56] References Cited

U.S. PATENT DOCUMENTS

| 1,855,323 | 4/1932 | Sirch | 251/8 X |
| 2,908,476 | 10/1959 | Hidding | 251/8 |
| 3,885,742 | 5/1975 | Menzel | 239/272 |

Primary Examiner—Robert B. Reeves
Assistant Examiner—Gene A. Church
Attorney, Agent, or Firm—Charles E. Temko

[57] ABSTRACT

A valve assembly including an adjustable nozzle for directing an aimed thin stream of water soluble coolant to a machining cutter. The construction includes an elongated body which houses a valve, the nozzle in adjustable relation, and means for magnetically supporting the assembly upon a machine tool. The nozzle may be fed directly from a pump, or through a foot operated valve in series therewith. The valve is of thumbscrew type and includes a spherical ball which presses against a segment of flexible tubing passing through the valve body to obstruct the lumen of the tube without damage.

2 Claims, 7 Drawing Figures

NEEDLE STREAM VALVE

REMARKS

This invention relates generally to the field of cooling devices for distributing a flow of coolant liquid against a machine tool cutter to prevent overheating of the tool and work during a machining operation. Devices of this general type are known in the art, and the invention lies in specific constructional details which permit improved efficiency in operation and substantially lower cost of manufacture.

Devices known in the art normally provide a rather full flow of coolant to the tool, the coolant being collected in a trough disposed therebelow, and returned to a sump for recycling. This procedure eliminates the need for precise aiming of the stream, that creates a rather high degree of moisture and often fog in the area ambient to the machine tool room, coating everything within this area with a film of water, and promoting rusting. Further, with the relatively large volume of liquid involved, only a relatively few nozzles can be serviced by a single pump.

SUMMARY OF THE INVENTION

Briefly stated, the invention contemplates the provision of an improved needle stream cooling device which feeds a narrow aimed stream of coolant of relatively low volume to a required point, the volume of the coolant being such that most of the same is consumed by evaporation on contact with the hot tool, leaving very little coolant to be recycled. Up to thirty of such nozzles can be accommodated by a single pump. The individual stream units each include an elongated body, one end of which mounts a magnet which enables the body to be secured in convenient position upon a machine tool. The body includes means for supporting a liquid feeding tube, and a valve operating directly upon the tube. A free end of the body adjustably supports a needle stream nozzle. The valve is operated by a thumbscrew, and means is provided in the form of a steel ball disposed beneath the threaded shank of the screw to prevent the end of the screw from damaging the supply tube during opening and closing.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
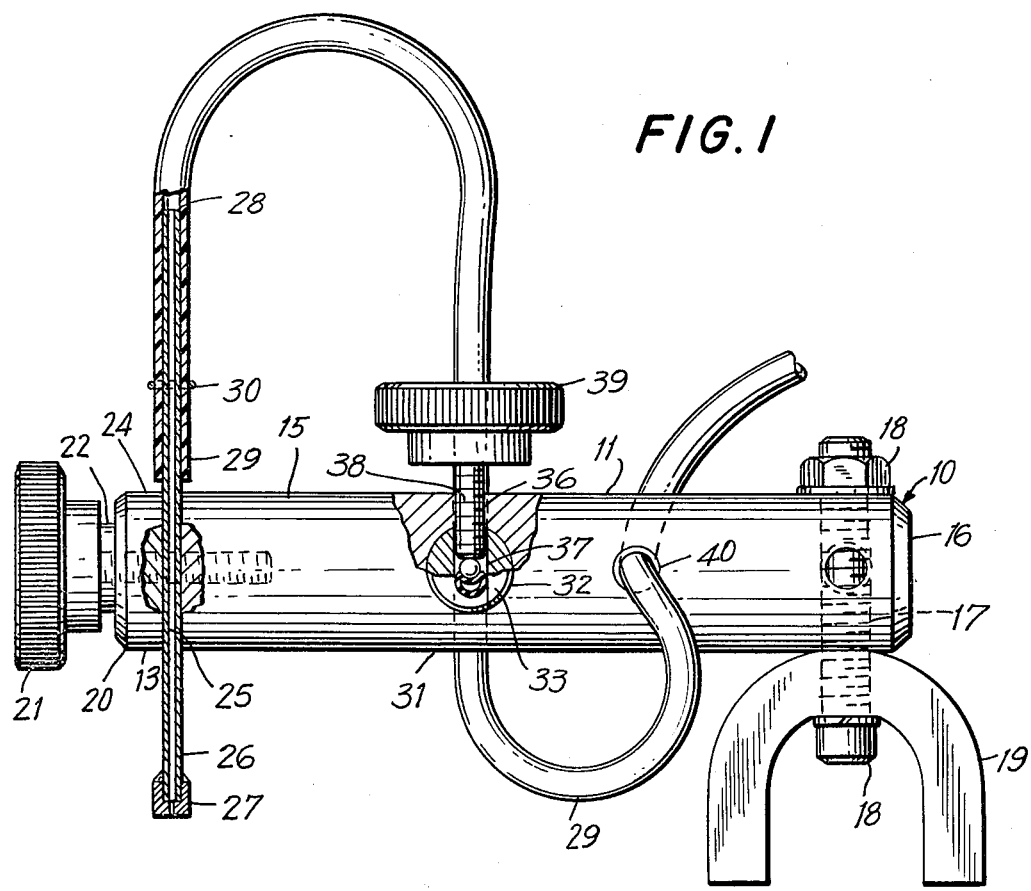
FIG. 1 is a side elevational view of a valve body assembly comprising a part of a disclosed embodiment of the invention.
Figure 2:
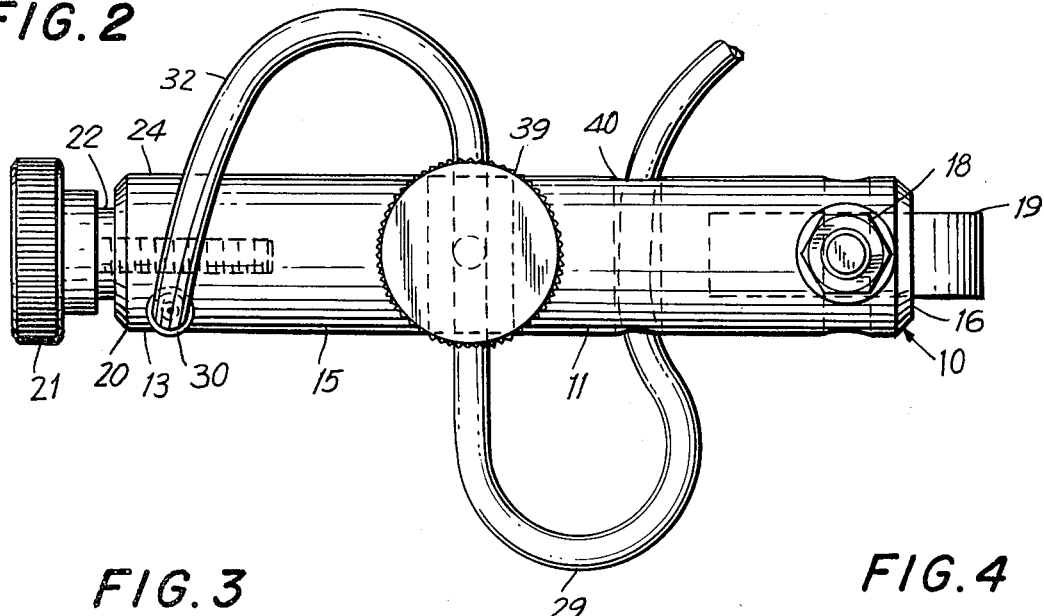
FIG. 2 is a second elevational view thereof as seen from the upper portion of FIG. 2.
Figure 3:
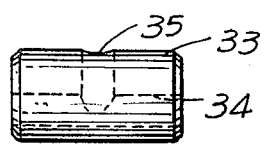
FIG. 3 is a side elevational view of a bushing forming a part of the structure of FIG. 1.
Figure 4:
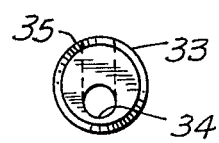
FIG. 4 is an end elevational view of the bushing.

In accordance with the invention, the device, generally indicated by reference character 10, comprises broadly: a needle stream valve assembly 11 (FIGS. 1 to 4, inclusive) and a foot valve assembly 12 (FIGS. 5 to 8, inclusive).

The valve assembly 11 includes a valve body 15 of generally elongate configuration, including a first end 16 having threaded openings 17 accommodating a nut and bolt 18 which secure a U-shaped magnet 19 thereon to enable the valve body to be magnetically secured to a suitable location upon a machine tool (not shown).

A second end 20 is provided with a thumbscrew 21 and washer 22 for securing a rotating support member 23 against a planar end surface 24 thereon. The support member 23 is provided with a transversely extending offset bore 25 supporting a rigid hollow tube 26. A nozzle 27 is secured on a first end thereof, while a second end 28 engages an end of a flexible plastic tube 29. Elastic retaining means 30 may be employed to assure a liquid type interconnection.

Disposed in a medial area 31 of the valve body is a transverse bore 32 having a fitted cylindrical bushing 33 therein. The bushing has an offset axially disposed bore 34 and a transversely extending bore 35 communicating with a threaded bore 36 in the valve body. A steel ball 37 of diameter corresponding to that of the tube 29 is disposed in the bore 36, and underlies the threaded shank 38 of a thumbscrew 39. Another transverse bore 40 provides a passage for the tube 29, and prevents kinking of the tube in the area of the valve body. It will be observed that by rotating the thumbscrew, the ball 37 is pressed against the outer surface of the tube 29, to constrict the lumen of the tube and thereby control the flow of coolant to the nozzle 27.

Figure 5:
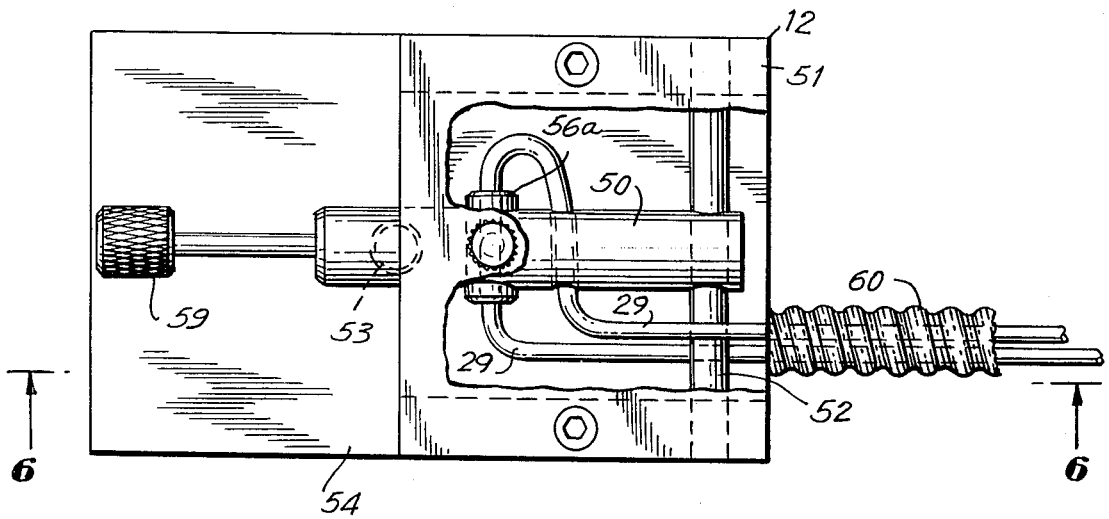
FIG. 5 is a top plan view of a second valve body assembly forming a part of the disclosed embodiment.
Figure 6:
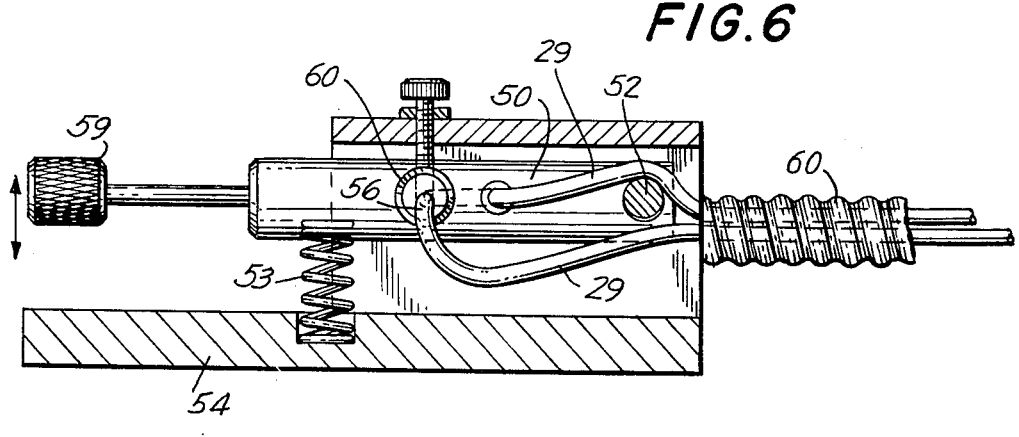
FIG. 6 is a side elevational view thereof partly broken away to show detail.
Figure 7:
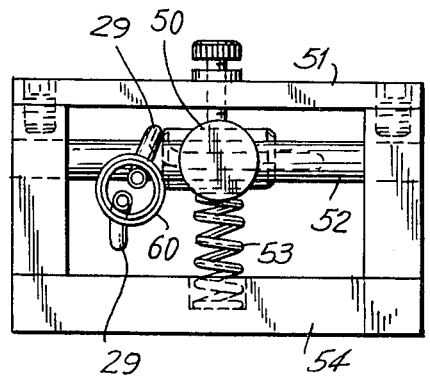
FIG. 7 is an end elevational view thereof, partly broken away to show detail as seen from the right hand portion of FIG. 7.

Referring to FIGS. 5 to 7, inclusive, the foot valve assembly 12 is connected in series with the assembly 11. It includes a valve body 50 secured in pivotal relation to a top plate 51 by a transversely extending shaft 52. A coil spring 53 in a base member 54 urges the valve body 50 upwardly whereby a segment 56 of the tube 29 disposed in a bushing 56a is clamped by the screw 57 and steel ball 58. A foot pad 59 connected to a second end of the valve body 50 moves the valve body in an opposite direction against the spring 53 to open the lumen in the tube. A bore 60 in the valve body serves the same function as the bore 30 in the valve body 15. Since the valve body 50 is normally placed on the floor of the tool room, a protective flexible tubing 60 is preferably placed about the adjacent portion of the tube 29 to insulate the same against chips, soil and other deleterious material.

The foot valve assembly communicates with a coolant pump (not shown) of known type. The purpose of the foot valve assembly is to allow an operator to use both hands to operate a machine tool and hold a workpiece, and to control the flow of coolant by his foot, thereby eliminating wasteful excessive use of coolant, and allowing the work area to be uncluttered by the mixture of excess coolant fluid with machine chips.

It may thus be seen that I have invented novel and highly useful improvements in cutting coolant systems, in which by the provision of novel valve construction, coolant may be supplied in the form of a fine aimed stream, rather than as a flood, with a substantial improvement in the reduction of wastage of coolant fluid, and the maintenance of the machine tool in far neater condition. The construction lends itself to die casting manufacturing techniques, where the volume of production is justified, and manufacture of the entire embodiment may be accomplished at a relatively low cost of production. The embodiment is readily disassemblable for servicing and repair by merely disengaging the thumbscrews, no tools being required for this purpose.

I wish it to be understood that I do not consider the invention limited to the precise details of structure shown and set forth in this specification, for obvious modifications will occur to those skilled in the art to which the invention pertains.

I claim:

1. In a system for supplying a liquid coolant to a cutting tool, an improved needle stream valve assembly comprising: a generally elongated valve body, said valve body having a medially disposed transversely extending bore, and a cylindrical bushing disposed in said bore, said bushing having a first axially disposed bore and a second transversely disposed bore communicating therewith; a segment of hollow flexible tubing disposed in said first bore, and a rigid sphere of corresponding diameter disposed in said second bore; screw means carried by said valve body and adjustably pressing said sphere against said tube segment to control the flow of fluid therethrough; said valve body having a first end, and means carried by said first end for attaching said body to a machine tool; said valve body having a second end, a support member adjustably mounted upon said second end for rotation about the principal axis of said valve body, a hollow tube carried by said support member having a nozzle on one end thereof, said tube having a second end, and a second flexible tube segment having a first end communicating with said second end of said hollow tube, and a second end thereof communicating with said first flexible tube segment.

2. A system in accordance with claim 1, further comprising: a base member, a top plate, and a laterally extending shaft mounted therebetween pivotally carrying one end of a second generally elongated valve body, a second end of said valve body having pedal means connected thereto; said second valve body having a medially disposed transversely extending second valve bore, a cylindrical second valve bushing disposed in said second valve bore, said second valve bushing having a first axially disposed second valve bore and a second transversely disposed second valve bore communicating therewith; a further segment of said hollow flexible tubing disposed in said first axially disposed second valve bore, and a rigid sphere of corresponding diameter disposed in said second valve bore; set screw means being carried by said top plate and adjustably pressing said sphere against said further tube segment to control the flow of fluid therethrough; resilient means carried by said base and urging said second valve body in a direction towards said set screw means, pressure applied to said pedal means serving to pivot said second valve body in a direction away from set screw means to open said second valve.

* * * * *